Patented July 15, 1952

2,603,612

UNITED STATES PATENT OFFICE 2,603,612

FABRIC TREATING THERMOPLASTIC RESIN-ROSIN COMPOSITION

René Jean Benjamin Elissabide, Basses-Pyrenees, France

No Drawing. Application December 29, 1947, Serial No. 794,421

5 Claims. (Cl. 260—23)

The present invention relates to a fabric treating solid composition and method for the treatment of fabrics.

More particularly, the present invention relates to a shaped mass, as a wafer or stick, for treating certain portions of a fabric adjacent a crease therein and adapted to facilitate the production of a more permanent crease and a method for applying a relatively permanent crease to a fabric.

Various expedients have been suggested previously for rendering the creases and folds customarily applied to fabrics more permanent; for example, it has been suggested that the entire fabric may be impregnated in order to stiffen or size the same. It has also been suggested that certain portions of a garment may be produced of special materials which are thermoplastic so that upon the application thereto of a hot iron permanent folds may be produced. All of these expedients possess a disadvantage in that a special treatment step must be employed, which results in a visible change throughout the thickness of the fabric and in its properties.

Various types of marking crayons which include large proportions of pigments, together with a relatively minor proportion of resin and adapted to make a permanent mark upon a fabric, are also known. In general, marking crayons of this type leave a mark which is intended to be permanent and include solvents and softeners so that the mark desirably impregnates the fabric.

The present invention has for an object the provision of a novel treatment means which is adapted to be applied preferably to the rear surface immediately opposed to a crease or fold and when so applied renders more permanent the aforesaid crease or fold without producing any mark upon the fabric which is visible from the outer side thereof.

A second general object of the present invention is to provide a novel wafer or stick composed primarily of two essential materials, i. e., a major proportion of powdered thermoplastic resin, capable of softening at temperatures normally used in the pressing of garments, combined with a minor proportion of a binder material having a more or less pasty characteristic and capable of forming together with the resin a shaped, stable, solid mass.

A third general object of the present invention is to provide a novel method for setting a crease which includes the treatment of an extremely small portion of a fabric garment immediately opposed to the outer surface thereof containing the crease, with a stick or wafer capable of leaving a fine line and a powdered thermoplastic resin in the fabric.

Other objects and advantages of the invention will become apparent from the subsequent description and claims.

In general, the present invention is practiced by providing a thermoplastic resin as, for example, vinyl chloride, copolymers of vinyl chloride and vinyl acetate, butadiene polymers, natural rubber, chlorinated rubber, and other thermoplastic resins well known in the art. The resin is employed as a powder, preferably fine. This is produced by chilling the resin to a temperature sufficiently low to cause its embrittlement as, for example, vinyl chloride polymers should be chilled to between about $-10°$ C. to $-20°$ C. The resin may then be treated in a conventional hammer mill or ball mill being slowly ground to the consistency of fine talc. Care should be taken during this part of the process to avoid raising the temperature or softening the resin. Thereafter, the product may be screened to separate any larger particles.

The powdered material is combined with the binder by triturating the same in a conventional mixer as, for example, a Banbury type mixer may be utilized. Preferably, the binder should be free from any substantial amount of water or volatile solvent since it has been found preferable to avoid any solvent in the final mass. It has been found that the presence of any substantial amount of solvent in the final mass tends to cause the trace produced on the cloth to strike through or impregnate the cloth and this phenomena should be avoided. As an example of satisfactory binder, common soap has been used and particularly a soap containing a certain proportion of rosin. A soap suitable for use in the present process is one containing approximately 63% of fatty acid residues and of rosin. Preferably, the rosin should be from one-third to one-half of the saponifiable material used for forming the soap.

The resin should preferably constitute a major proportion of the finished solid composition. In other words, more than 50% of resin in powdered form should be used and less than 50% of binder. Although a particularly satisfactory binder is soap of the character just described other binding materials may be used, for example, paraffin, mixtures of beeswax and soap and mixtures of stearine. Preferably, the binder should contain a substantial proportion of rosin, i. e., from 10% to 20%, of the solid composition. The incorporation of rosin enables the composition to adhere more readily to the fabric.

It is preferable that the binder and resin be substantially colorless as this produces a deposit upon the fabric which is substantially invisible.

During the process of mixing the binder and the powdered resin, the temperature should be maintained sufficiently low so that no fusion of the resin powder takes place and so the powder will be homogeneously distributed throughout the binding substance. After the homogeneous, stiff, pasty mass has been produced from the admixture of binder and resin, the resultant mass may be molded into a block and the block made into blanks by utilizing the conventional wire cutters ordinarily used in the soap industry.

The blanks may be molded into a suitable shape by utilizing conventional soap molds. The shapes preferably used include a thin wafer having a sharp periphery or an elongated stick provided with a pointed end. Other suitable shapes are triangular or other geometrical blocks, or any other shape suitable for depositing the material in the form of a relatively thin line having a width of approximately one millimeter.

The solid composition hereinbefore described can be utilized for producing a more permanent crease on substantially any of the conventional fabrics, providing these fabrics, where they include any substantial proportion of artificial fibers, have a higher fusing point than the thermoplastic resin forming a part of the composition of the present invention. In general, the various thermoplastic compositions should have a fusing point in the neighborhood of 90° C.-100° C. As an example, in utilizing the composition of the present invention upon a pair of trousers a crease is first produced within the trouser legs by the conventional pressing method. Thereafter, the trousers are turned inside out and a deposit of composition is applied to the inside of the crease in the form of a line of material of approximately one millimeter in width. Thereafter, the trousers are reversed and pressed once again in such manner that the previous crease line is carefully followed. The second pressing operation is performed with a hot iron heated to such temperature that the thermoplastic portion of the crease setting composition is softened. This produces a localized adherence and/or bending of the textile fibres adjacent the inner surface of the crease mark. Upon cooling, it will be found that a crease so produced is far more permanent than an ordinary crease and survives to a substantial degree after prolonged wear and conventional cleaning operations. The following examples serve to illustrate the composition of the present invention but are not intended to limit the same.

Example 1

| | Parts |
|---|---|
| Polyvinyl chloride in the form of a powder | 60 |
| Soap binder composed of the following: | |
| Rosin | 12 |
| Tallow | 14 |
| Caustic soda | 3.5 |
| Water | 10.5 |

The vinyl chloride and soap binder are thoroughly mixed together and thereafter molded into blocks of a suitable size. The blocks are in turn cut as by a soap cutting wire to produce blanks. The blanks were molded in the same manner as soap into elongated sticks or any other shape suitable for producing a fine line deposit upon a fabric. When coated upon the inside of a woolen or cotton garment directly opposite a crease therein and subsequently treated with a hot iron, a relatively permanent crease was produced.

Example 2

| | Parts |
|---|---|
| Polyvinyl chloride in the form of a powder | 55 |
| Paraffin | 30 |
| Rosin | 15 |

The paraffin and rosin were thoroughly admixed as by melting the two ingredients together, thereafter cooled, and mixed with the vinyl chloride powder in a Banbury mixer. The resulting composition was formed into wafers or sticks as in Example 1 and when utilized upon a garment also gave satisfactory results.

Example 3

| | Parts |
|---|---|
| Powdered rubber latex | 65 |
| Stearine | 20 |
| Rosin | 12 |
| Lecithin | 3 |

These ingredients were mixed, the binding materials being first thoroughly mixed and thereafter combined with the latex powder. When formed into suitable shapes, a fabric treating solid composition of the character hereinbefore described was produced.

Example 4

| | Parts |
|---|---|
| Chlorinated rubber | 70 |
| Rosin | 20 |
| Beeswax | 5 |
| Soap of Example 1 | 5 |

A satisfactory composition for the present purposes was also produced from the above ingredients as hereinbefore described.

In the above examples all of the proportions indicated are by weight.

It will be obvious to those skilled in the art that various changes may be made without departing from the spirit of the invention and therefore the invention is not limited to what is described in the specification but only as indicated in the appended claims.

What is claimed is:

1. A shaped stable mass for producing a substantially linear deposit on the surface of fabric without substantial penetration thereof so as to permit deposition of a surface layer of fusible resin on the inside of a garment crease for subsequent hot iron setting thereof without visibly striking through to the outside of said garment consisting of a mechanical mixture of a major proportion of powdered thermoplastic resin free from solvent and plasticizer and having a softening point of approximately 90–100° C. and as a binder for said powdered resin a minor proportion of a semi-solid selected from the class consisting of mixtures of common soap and rosin, mixtures of paraffin and rosin, mixtures of stearine and rosin, mixed rosin-fatty acid soaps and mixtures of rosin and mixed rosin-fatty acid soaps, said semi-solid containing from 10–20% by weight of the mass of rosin.

2. The mass of claim 1 wherein the thermoplastic resin is a vinyl resin.

3. The mass of claim 1 wherein the thermoplastic resin is a vinyl resin and the binder is a mixture of common soap and rosin.

4. The mass of claim 1 wherein the thermoplastic resin is a vinyl resin and the binder is a mixed rosin-fatty acid soap.

5. The mass of claim 1 wherein the thermoplastic resin is a vinyl resin and the binder is a mixture of mixed rosin-fatty acid soap and rosin.

RENÉ JEAN BENJAMIN ELISSABIDE.

REFERENCES CITED

The following references are of record in the file of this patent:

UNITED STATES PATENTS

| Number | Name | Date |
|---|---|---|
| 1,688,117 | Davis | Oct. 16, 1928 |
| 1,966,856 | Groff | July 17, 1934 |
| 2,051,840 | Gerhart | Aug. 25, 1936 |
| 2,075,543 | Reed et al. | Mar. 30, 1937 |
| 2,298,078 | Wolff | Oct. 6, 1942 |
| 2,317,372 | Gessler et al. | Apr. 27, 1943 |
| 2,380,126 | Sturm | July 10, 1945 |
| 2,403,166 | Ballard | July 2, 1946 |
| 2,404,322 | Southard | July 16, 1946 |
| 2,449,534 | Meyer | Sept. 14, 1948 |

FOREIGN PATENTS

| Number | Country | Date |
|---|---|---|
| 420,564 | Great Britain | Dec. 4, 1934 |